(12) United States Patent  
Mäder et al.

(10) Patent No.: US 9,963,300 B2
(45) Date of Patent: May 8, 2018

(54) COLLECTING DEVICE FOR A CONVEYOR (71) Applicant: WRH Walter Reist Holding AG, Ermatingen (CH)

(72) Inventors: Carl Conrad Mäder, Hittnau (CH); Alexis Wiasmitinow, Winterthur (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days. days.

(21) Appl. No.: 15/266,031

(22) Filed: Sep. 15, 2016

(65) Prior Publication Data

US 2017/0081127 A1 Mar. 23, 2017

(30) Foreign Application Priority Data

Sep. 17, 2015 (CH) ........................................ 1351/15

(51) Int. Cl.
*B65G 35/00* (2006.01)
*B65G 47/29* (2006.01)
(Continued)

(52) U.S. Cl.
CPC ........... *B65G 35/005* (2013.01); *B65G 35/00* (2013.01); *B65G 47/29* (2013.01);
(Continued)

(58) Field of Classification Search
CPC ...... B65G 25/00; B65G 25/08; B65G 35/005; B65G 35/02
(Continued)

(56) References Cited

U.S. PATENT DOCUMENTS 1,981,641 A 11/1934 Benoit
2,141,362 A * 12/1938 Platt ..................... A23N 12/023
198/630
(Continued)

FOREIGN PATENT DOCUMENTS

DE 610732 3/1935
EP 0 485 937 5/1992
(Continued)

OTHER PUBLICATIONS

Switzerland Search Report dated Apr. 11, 2015, Application No. CH 01351/15.
(Continued)

*Primary Examiner* — James R Bidwell
(74) *Attorney, Agent, or Firm* — Rankin, Hill & Clark LLP (57) ABSTRACT A collecting device for collecting discrete items that are delivered from a conveyor to a delivery location. The collecting device includes a collecting region with a collecting device, in which collecting region the discrete items are collected, a delay region with a discrete items support, and a feed region having a feed device. The delay region is prior to the collecting region and is the region in which the discrete items delivered from the conveyor are held up. The feed region is prior to the delay region and is the region through which the discrete items are fed from conveyor to the delay region. The delay region has a conveying mechanism that is capable of conveying the held-up discrete item from the delay region into the collecting region by way of a conveying-active movement.

19 Claims, 7 Drawing Sheets

(51) Int. Cl.
   *B65G 47/88* (2006.01)
   *B65G 47/96* (2006.01)
(52) U.S. Cl.
   CPC ........ *B65G 47/8846* (2013.01); *B65G 47/962* (2013.01); *B65G 2201/02* (2013.01)
(58) Field of Classification Search
   USPC ...... 198/630, 740, 631.1, 463.4, 463.5, 529, 198/531, 370.08, 457.07
   See application file for complete search history.

(56) References Cited

U.S. PATENT DOCUMENTS

| | | | | |
|---|---|---|---|---|
| 2,371,783 | A * | 3/1945 | Sneed | A01K 43/00 198/469.1 |
| 3,297,125 | A * | 1/1967 | Pool | A01D 46/26 198/630 |
| 4,389,148 | A * | 6/1983 | Lorenz | B65G 57/035 198/740 |
| 6,199,683 | B1 | 3/2001 | Michell et al. | |
| 7,296,673 | B2 * | 11/2007 | Blonigan | B65G 49/064 198/369.6 |
| 2007/0131521 | A1 * | 6/2007 | Temming | B65B 23/06 198/608 |

FOREIGN PATENT DOCUMENTS

| | | | |
|---|---|---|---|
| EP | 2 050 697 | 4/2009 | |
| GB | 2168665 | 6/1986 | |
| JP | 59-69302 | 4/1984 | |
| JP | 59-212308 | * 12/1984 | ............ B65G 25/08 |
| JP | 59-217523 | 12/1984 | |
| NL | 9201814 | 5/1994 | |

OTHER PUBLICATIONS

European Search Report dated Feb. 13, 2017, Application No. 16189118.9.

* cited by examiner

COLLECTING DEVICE FOR A CONVEYOR

BACKGROUND OF THE INVENTION

Field of the Invention

The invention lies in the field of conveying and sorting technology, and relates to a collecting device for a conveyor for collecting discrete items (sometimes called piece goods) that are delivered from a conveyor to a delivery location. The invention moreover relates to a conveying facility with a conveyor for conveying discrete items and with a collecting device, as well as to a method for operating the collecting device.

Description of Related Art

Conveyors with collecting devices, in particular sorting facilities, serve for sorting discrete items conveyed along a conveying path, by way of delivery of the discrete items to different delivery locations arranged along the conveying path, according to defined criteria such as e.g. product uniformity. For this, the discrete items are delivered from the conveyor to collecting devices at the respective delivery locations, in a targeted manner via a control. The discrete items are thereby conveyed from the delivery locations to a collecting region of the collecting devices. The conveying between the delivery location and the collecting region usually is effected in an unguided and passive manner.

Passive conveying means that the discrete items are conveyed solely by their kinetic energy given to them by the conveyor, and/or by way of gravitational assistance. In other words, no actively driven conveying elements conveying the discrete items are provided. Thus, for example, it is known to deliver the discrete items from the delivery location into the collecting region by way of chutes, which is to say slides.

The unguided conveying of the discrete items from the delivery location to the collecting region means that the speed and, as the case may be, also the exact movement path of the discrete items cannot be controlled.

Sensitive discrete items, such as, e.g., bottles, should now also be able to processed in sorting facilities with collecting devices of the type mentioned above. Conventional collecting devices, however, have the disadvantage that the sensitive discrete items can hit one another and become damaged when being conveyed from the delivery location into the collecting region in an unguided, which is to say uncontrolled, manner. Moreover, it is also possible for unguided discrete items to hit other discrete items in the collecting region on entering into this collecting region, and likewise becoming damaged. Damage to sensitive discrete items, which are conveyed in an unguided manner, can also occur when these hit parts of the collecting device.

A further disadvantage lies in the fact that discrete items, which are not present in a transport packaging, but are present in the sales packaging or are without any packaging, can assume traces of use in the collecting device due to them hitting other discrete items or parts of the collecting device, and can lose their brand-new appearance due to this, even if they are still as good as new.

Sensitive sales packaging, in which the products are packaged can also be damaged or obtain traces of use due to such collisions. This leads to the products no longer being able to be sold at all or no longer being able to be sold as being new.

SUMMARY OF THE INVENTION

It is therefore an object of the present invention, to suggest a collecting device that permits a gentle conveying of the discrete items from the delivery location to the collecting region of the collecting device.

The collecting device according to the invention is now characterised in that this comprises the following regions:
- a collecting region with a collecting device, in which collecting region the discrete items are collected;
- a delay region with a discrete items support, the delay region being prior to the collecting region and in which the discrete items delivered from the conveyor are held up, and
- a feed region with a feed device, said feed region being prior to the delay region and via which the discrete items are fed from the delivery location to the delay region.

The feed region, the delay region and the collecting region in particular are in direct succession.

The feed device can include a guide or guiding means, via which the discrete items are passively conveyed into the delay region. Such guiding means can, for example, include a conveying chute.

The delay region, in particular, is designed such that the discrete item, which is fed from the feed device, is braked and held up (delayed) in the delay region.

The discrete item thereby comes to lie on the discrete items support (rest). The discrete items support forms a support surface (rest surface) for this.

The discrete items support can be designed of one or more parts.

The term "held up" thereby is to mean that the conveying speed of the discrete item in the delay region is reduced compared to in the feed region and thus the (further) conveying of the discrete item is delayed in the delay region. The discrete item can thereby come to a standstill in the delay region.

The discrete items support thereby has the task of receiving the discrete item in gentle manner before being conveyed further into the collecting region.

The delay region now has a conveying mechanism, which is capable of conveying the held-up (delayed) discrete item from the delay region, in particular from the discrete items support of this delay region, into the collecting region by way of a conveying-active movement. The conveying, in particular, is effected actively.

The conveying mechanism in particular includes at least one conveying-active advance body (thus one that is active in conveying), which acts such that the held-up discrete item is conveyed further in the conveying direction. The conveying-active advance body executes a conveying-active movement for this.

The at least one conveying-active advance body can act upon the discrete item in a direct or indirect manner.

According to a further development of the invention, the conveying-active movement of the at least one conveying-active advance body includes at least one movement section with a vertical movement component, which is directed counter to gravity.

The at least one conveying-active advance body during the execution of the conveying-active movement, in particular, is arranged behind the discrete item to be conveyed, considered in the conveying direction.

The conveying mechanism, in particular, is designed such that the at least one conveying-active advance body during the execution of the conveying-active movement is movable from the rear towards the discrete item, considered in the conveying direction.

The conveying mechanism for this, in particular, is designed such that the at least one conveying-active advance body at least over a movement section of its conveying-active movement has a vertical movement component directed counter to gravity, as well as a horizontal movement component directed in the conveying direction.

According to a preferred variant of this embodiment, the at least one conveying-active advance body at least over a movement section of its conveying-active movement simultaneously has both movement components.

The mentioned movement section, in particular, is arranged at the beginning of the conveying-active movement.

The conveying mechanism, in particular, is designed for the execution of a cyclic movement by the at least one conveying-active advance body. A cyclical movement is characterised by its repeatability. The cyclic movement can, e.g., be circulating movement or a linear to and fro movement.

The conveying-active movement of the conveying mechanism or of the at least one conveying-active advance body can be periodic. Accordingly, the discrete items are fed to the delay device in a cycled, which is to say paced, manner.

The conveying mechanism can include a revolving device, in particular a rotation apparatus, in which the at least one conveying-active advance body is moved along a closed movement path.

The at least one conveying-active advance body, in particular, can be arranged in a manner rotating about an axis.

The axis, in particular, is arranged below the movement path of the discrete item. The axis, in particular, is arranged transversely to the conveying direction. The axis, in particular, is also arranged transversely to the vertical.

The conveying mechanism or the at least one conveying-active advance body, in particular, is actively driven by way of a drive, e.g. including an electric motor. In other words, the discrete item is actively conveyed by way of the conveying mechanism.

The drive, in particular, is controlled via a control device. The collecting device or the sorting facility can include sensors, which, for example, detect the delivery of a discrete item onto a collecting device. The drive of the conveying mechanism can now be controlled via the control device on the basis of the sensor data.

The invention moreover also relates to a method for collecting discrete items, which are transferred from a conveyor to a delivery location of a collecting device according to the invention.

The method includes the following steps:
  feeding a discrete item from the feed device of a feed region to the discrete items support of a delay region and holding it up, in particular, also braking the discrete item in the delay region;
  acting upon the discrete item by way of a conveying mechanism, which executes a conveying-active movement in the delay region, by which means the discrete item is conveyed from the discrete items support in the delay region into the collecting region.

The discrete items can slide, slip or roll on the discrete items support.

The discrete items, in particular, are individually fed to the delay region, so that two discrete items cannot collide with one another. The discrete items, however, can also be fed to the delay region in groups of several discrete items.

According to a further development, the at least one advance body of the conveying mechanism during at least a movement section of its conveying-active movement is moved upwards with a vertical movement component directed counter to gravity, behind the discrete item held up on the discrete items support, considered in the conveying direction.

According to a further development of the method, the at least one advance body during its conveying-active movement, considered in the conveying direction, is additionally moved towards the discrete item with a horizontal movement component directed in the conveying direction.

If the advance body is rotatably mounted about an axis/pivot, then the advance body moves or rotates about the axis during its conveying-active movement.

The discrete item in the delay region is arranged on the discrete items support.

The discrete items support can form a curvature with an ascending curvature section. The term "ascending" means a gradient counter to the gravitational direction.

Curvature, with regard to the supports surface, can include a concave or convex curvature section.

The discrete items support, in particular, can form a receiving trough for the discrete item.

According to a first embodiment of the invention, the discrete items support is a flexible, extensive support body.

Flexible means that the discrete items support is pliable and yielding without plastic deformation. The flexibility can also be effected by joints. The discrete items support can be flexible solely due to the effect of gravity. Flexible can also mean that the discrete items support is torsionable.

Extensive means that the surfaced extension (width and length) of the support body is much larger than a height extension (thickness).

The receiving trough according to this embodiment variant, in particular, is formed between two support or fastening locations, which are arranged successively in the conveying direction and on which the support body is supported. The support locations are suitably spaced from one another.

The piece goods support is arranged, for example, in a sagging manner, in particular in a freely sagging manner, in the region of the receiving trough.

The delay region according to this embodiment arrangement corresponds to a capture region, in which the fed discrete item is braked and caught, which is to say received, by the receiving trough.

The conveying mechanism according to this embodiment variant is designed to lift the flexible, extensive support body in the region of the curvature, in particular of the receiving trough, during its active conveying, which is to say during its conveying-active movement, such that a discrete item which lies in the region of the curvature or in the receiving trough is conveyed further in the conveying direction due to the lifting of the support body.

The conveying mechanism according to this embodiment variant in particular is designed to lift the flexible, extensive support body over its entire width. The support body, in particular, is lifted uniformly over the entire width.

The discrete item, in particular, continues to lie on the support body with the further conveying.

In an embodiment of the method, the conveying mechanism or the at least one conveying-active advance body, by way of its active conveying, which is to say by its conveying-active movement, lifts the flexible, extensive support body from below, in the region of the curvature or of the receiving trough, and thus conveys the discrete item arranged in the region of the curvature, in particular the discrete item arranged in the receiving trough, in the conveying direction.

The support body is thereby in particular not driven in the conveying direction. This means that the support body remains stationary in the conveying direction.

The conveying mechanism or the at least one conveying-active advance body, during the conveying procedure thereby lifts the support body behind the discrete item moving on the support body in the conveying direction.

The conveying mechanism or the at least one conveying-active advance body, during the conveying procedure thereby lifts the support body, in particular behind the deepest location of the curvature or of the receiving rough, considered in the conveying direction.

The conveying mechanism in particular is designed to move the flexible, extensive support body in a wave-like manner. The wave-like movement of the support body in particular is effected in the conveying direction.

The conveying mechanism or the at least one conveying-active advance body, during its conveying-active movement lifts the support body in particular in the region of the curvature or of the receiving trough, in a lifting movement propagating in the conveying direction. The advancing lifting movement in particular effects the above-mentioned, wave-like movement of the support body in the conveying direction.

If specifically, the conveying-active movement of the at least one conveying-active advance body, apart from the mentioned vertical movement component, also has a horizontal movement component directed in the conveying direction, then the lifting of the support body propagates in the conveying direction. The discrete item is thereby moved in the conveying direction in front of the lifted section of the discrete items support which is to say in front of the advance body.

The at least one conveying-active advance body on executing the conveying-active movement is moved now upwards, behind the discrete item held on the discrete items support, considered in the conveying direction. The support body is lifted behind the discrete item, in the region of the curvature, in particular in the region of the capture trough, by way of this.

The at least one conveying-active advance body is moreover moved from the rear up to the discrete item by way of a further horizontal movement component in the conveying direction. The support body is continuously lifted in the conveying direction by way of this. The discrete item is thus advanced or conveyed in the direction of the collecting region and is transferred to this.

The at least one conveying-active advance body after completion of the conveying-active movement is moved downwards with a vertical movement component in gravitational direction and is moved further into its initial position with a horizontal movement component counter to the conveying direction.

The at least one conveying-active advance body can, e.g., be a crank or an arm, which rotates about an axis at a radial distance to this and which lifts the support body from below by way of the rotation movement about the axis.

The flexible, extensive support body can be belt-like. The support body can be a belt, a foil or a net.

The flexible, extensive support body can be of a textile sheet formation such as a fabric. The flexible, extensive support body can also be of bodies, which are chained or linked to one another, and be present, e.g., as mat chain.

According to a second embodiment variant of the invention, the discrete items support includes at least one recess, through which the at least one conveying-active advance body acts upon the discrete item during the execution of a conveying-active movement.

The at least one conveying-active advance body can be moved through the at least one recess, in particular with a vertical movement component, during the execution of a conveying active movement.

The at least one conveying-active advance body, in particular from below the support surface, can be moved through the at least one recess, above the support surface of the discrete items support, during the execution of the conveying-active movement.

In other words, the at least one conveying-active advance body is movable through the recesses, from the bottom to the top.

The at least one conveying-active advance body is movable further, in particular also again from the top to the bottom through the at least one recess during the execution of a circulating movement.

The conveying mechanism can include several conveying-active advance bodies, which as described above, each act upon a discrete item through a recess in the support body.

The support body can include several recesses, through which a conveying-active advance body or an advance element of the conveying-active advance body acts.

The discrete items support according to the second embodiment, in particular, is designed in a rigid manner. The discrete items support can be a plate-like body.

The discrete items support can form a plane support surface. The support surface can also be curved.

The support surface can be horizontal. The support surface can also be inclined.

The at least one conveying-active advance body according to the second embodiment body can include a plurality of advance elements that are arranged spaced from one another transversely to the conveying direction and which in each case are movable through a recess in the discrete items support.

The at least one recess, in particular, is a slot opening aligned parallel to the conveying direction. The slot openings can be arranged parallel next to one another and spaced from one another in the case of several recesses.

If the at least one conveying-active advance body or its advance elements are rotatably arranged about an axis, then the at least one conveying-active advance body or its advance elements, in particular, is/are led radially outwards away from the axis.

The at least one conveying-active advance body can include several advance elements arranged next to one another along the axis. The at least one conveying-active advance body forms a so-called advance strip or bar, in this manner.

Several conveying-active advance bodies, in particular advance strips can be arranged in manner distanced to one another and radially aligned about the axis.

The advance elements or the at least one conveying-active advance body are designed, e.g., in a compliant, in particular, elastic, manner, in order to thus dampen the conveying contact to the discrete item.

The advance elements can be rod-like or bristle like.

The conveying mechanism, in particular, can include a conveying brush with several brush strips that is rotatable about an axis.

The at least one conveying-active advance body during the execution of the conveying-active movement is now moved upwards through the recesses in the discrete items support, behind the discrete item held up on the discrete items support, considered in the conveying direction.

The at least one conveying-active advance body is moreover moved by a further horizontal movement component in the conveying direction, from the rear up to the discrete item, until it forms a conveying contact with the discrete item. The discrete item is now conveyed or pushed by the advance body engaging from the rear, in the direction of the collecting region, and is transferred to this region.

The advance body subsequently to the conveying-active movement is moved further, downwards through the recesses in the discrete items support, with a vertical movement component in the gravity direction, and moved further with a horizontal moment component counter to the conveying direction, into its initial position.

In its passive position, in which the advance body does not execute a conveying-active movement, but is moved further into its initial position, this body, in particular, is arranged below the support surface formed by the discrete items support.

The discrete items according to the present invention are collected in the collecting region until these are led away again out of the collecting region for further processing steps. The collecting region, for example, can be a collecting table or a collecting container for the discrete items.

The delay region arranged between the feed region and collecting region permits a gentle braking and holding-up, which is to say delay, of the discrete items. This is effected by way of the passively conveyed discrete item being automatically braked by the prevailing sliding friction and/or being gently braked in the delay region by way of flexible bodies such as advance elements or support body.

A gentle braking according to the first embodiment variant, for example, is effected by way of the discrete item being moved into the receiving trough. The discrete item is caught or received in a gentle manner in the compliant receiving trough due to the flexible design of the support body. The receiving trough, which is formed by a freely sagging section of the flexible, extensive support body, moreover permits a gentle attenuation of the feed conveying movement and by way of this a reduction of the movement energy of the discrete item.

A gentle braking, e.g., according to the second embodiment variant, can be effected by way of the discrete items running onto the flexible advance body in the delay region and thus being cushioned in a damped manner.

However, one can also envisage the discrete item, which is fed from the feed region to the support surface of the discrete items support being braked and, as the case may be, stopped, solely by way of sliding friction on the discrete items support.

The invention moreover relates to a sorting facility with a conveyor and with at least one collecting device according to the invention.

The conveyor, in particular, delivers the discrete items in an individual, which is to say singularised, manner. The conveyer can however also convey the discrete items in groups of several discrete items.

The conveyor can, e.g., be a sorting conveyor that is designed for sorting discrete items and is characterised by a plurality of delivery locations, at which the discrete items can be transferred from the sorting conveyor to a collecting device.

The conveyor can, for example, include a plurality of conveying means that convey a discrete item in each case.

The conveyor can, e.g., be a tilt-tray conveyor. The conveying means here are tilt trays, which are tilted or pivoted for delivery of the products to the respective delivery locations.

The conveyor can moreover be a gripper conveyor. The conveyor can also be a hanging conveyor.

The conveyor can also be a belt conveyor, such as a modular belt conveyor, with ejection stations for ejecting the discrete items to the respective delivery locations. The conveyor can also be a transverse belt conveyor.

The sorting facility include preferably several collecting devices that are arranged along the conveying path of the conveyor. The conveyor hereby includes at least one, in particular, a plurality of delivery locations, to which a collecting device is assigned in each case.

The collecting device according to the invention is particularly applied with the processing of product returns of sales locations. Such product returns take place, for example, with recall actions, customer returns, reduction of inventories or when changing the range.

Usually, the discrete items, i.e. the products are returned from the sales locations in an unsorted manner. The products then become unmixed again, which is to say are sorted, according to certain common features, by way of the sorting facility.

The products can be discrete items from the field of consumer products, such as, e.g., cosmetic articles, body care articles, medicines, foodstuffs, etc.

The products can be present as bottles, cans, tubes, pouches, boxes, cartons etc. The products can be packaged in sales packages.

BRIEF DESCRIPTION OF THE DRAWINGS

The subject-matter of the invention is hereinafter explained in more detail by way of embodiment examples which are represented in the accompanying drawings. There are shown schematically in each case wherein.

DETAILED DESCRIPTION OF THE INVENTION

Figure 1:
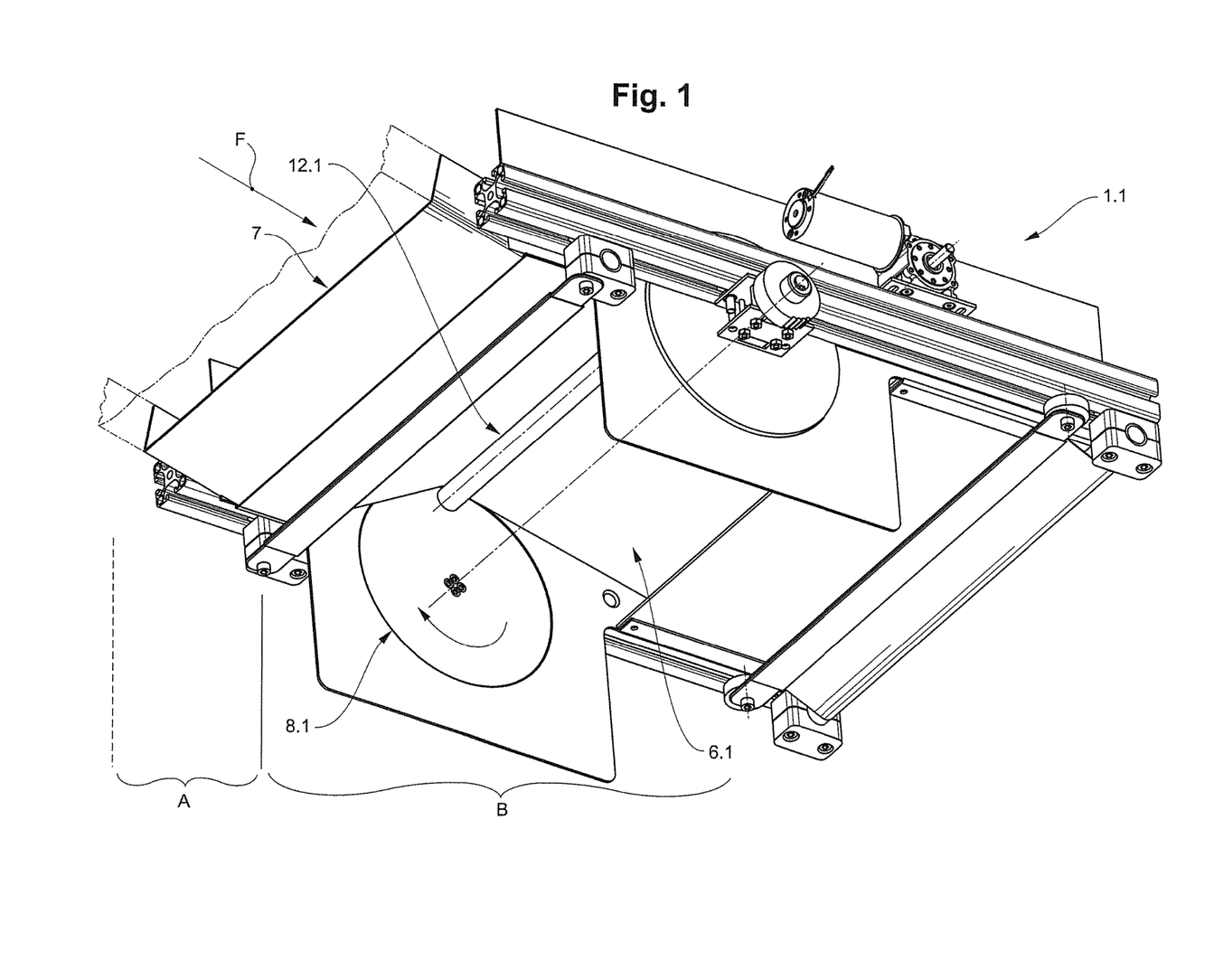
FIG. 1 is a perspective view obliquely from below, of an embodiment of a collecting device with a conveying mechanism in the delay region, according to the first embodiment variant.
Figure 4:
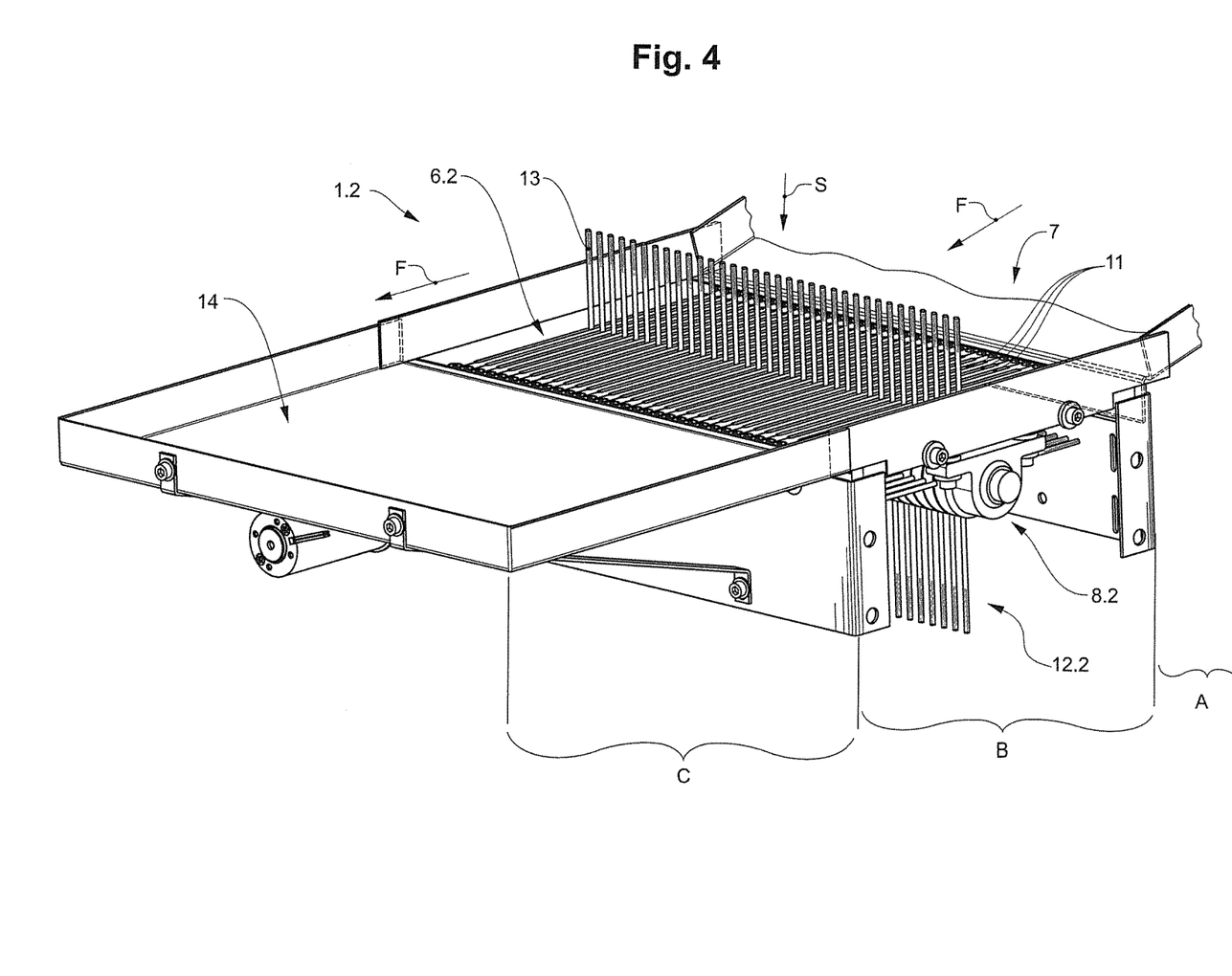
FIG. 4 is a perspective view of an embodiment of a collecting device, with a conveying mechanism in the delay region, according to the second embodiment variant.

The collecting device 1.1, 1.2 according to FIGS. 1 and 4 in each case include a feed region A with a feed device 7. The feed device 7 in each case comprises a conveying chute, via which the discrete items 2 are fed to the delay region B, in particular in a singularised which is to say individual manner.

Figure 2:
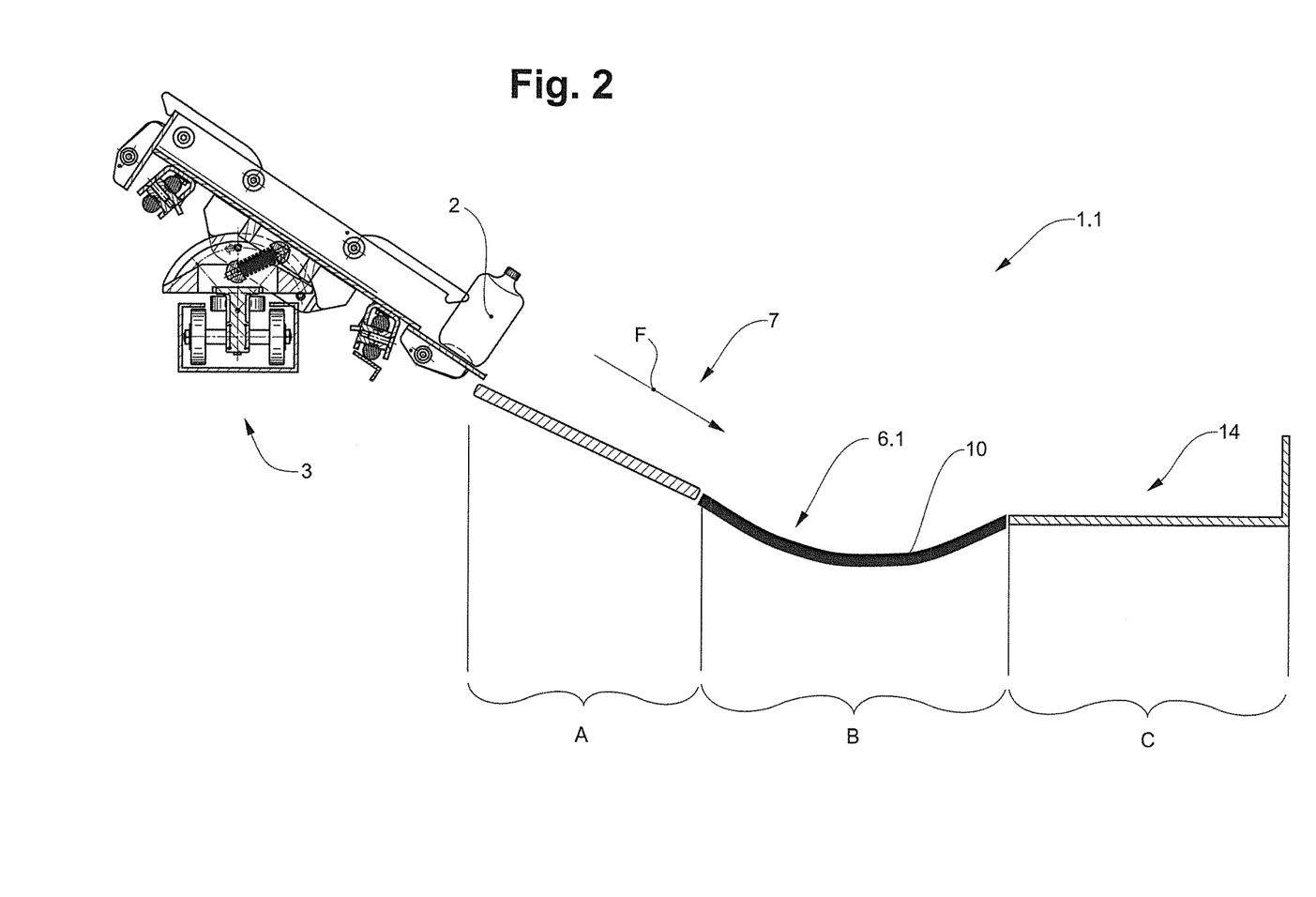
FIG. 2 is a lateral view of parts of the collecting device according to FIG. 1.

The discrete items 2, as is shown in FIG. 2, are delivered from the tilt-tray conveyor 3 to a delivery location and are transferred from the delivery location of the conveying slide to the feed device 7 in the feed region A. Of course, a different conveyor, such as, e.g., a gripper conveyor or a belt conveyor can also be provided instead of a tilt-tray conveyor 3.

A delay region B with a discrete items support 6.1, 6.2 is arranged subsequently to the conveying slide 7 or the feed region A.

The discrete items 2, which are fed via the conveying chute 7 to the discrete items support 6.1, 6.2, in particular, in an individual manner, are braked and caught or received on the discrete items support 6.1, 6.2.

The delay region B moreover includes a conveying mechanism 8.1, 8.2, by way of which the discrete items 2 can be fed to the collecting region C, in particular in an individual and controlled manner.

The collecting region C for this includes a collection table 14, on which the fed discrete items 2 are collected.

The discrete items support 6.1 is a flexible, extensive belt according to the embodiment according to the first embodiment variant (FIGS. 1, 2 as well as 3a-d). The belt 6.1 in the delay region B between two support or fastening locations forms a freely sagging region with a receiving trough 10, for the purpose of receiving an, in particular, individual discrete item 2 (see FIG. 3b).

A conveying mechanism 8.1 with an advance body 12.1 in the form of a crank or arm, which rotates at a radial distance about an axis, is arranged below the belt 6.1.

The crank or the arm 12.1 is moved upwards to the belt 6.1 in the region of the receiving trough 10, in a rotation movement. The crank or the arm 12.1 with an advance rotation movement lifts the belt 6.1 behind the deepest location of the receiving trough 10, considered in the conveying direction F (see FIG. 3c).

Figure 3A:
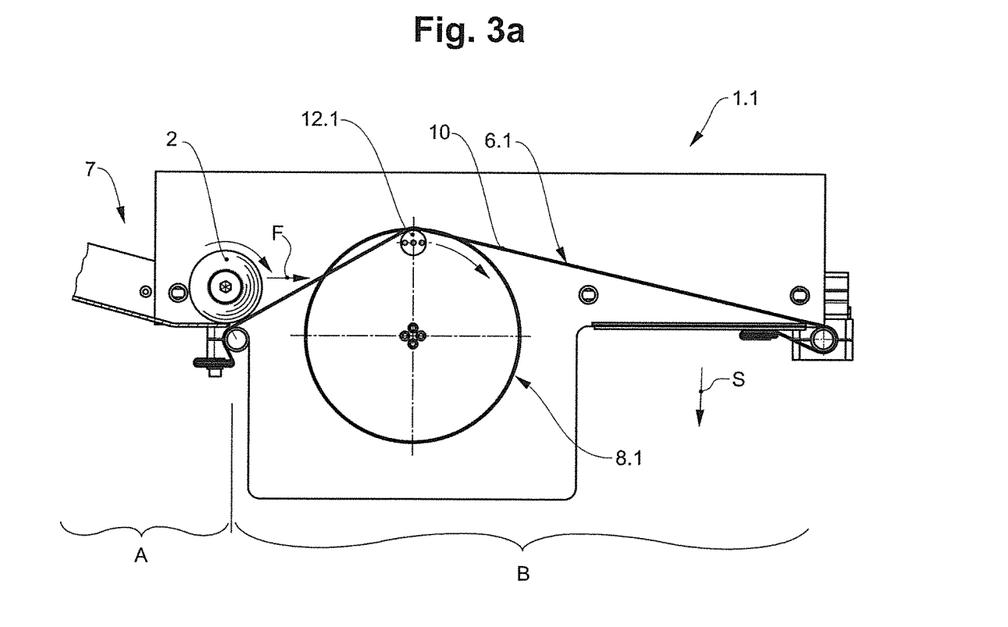
FIGS. 3a-3d are lateral views of the collecting device according to FIGS. 1 and 2, with the conveying mechanism in different advance positions.
Figure 3B:
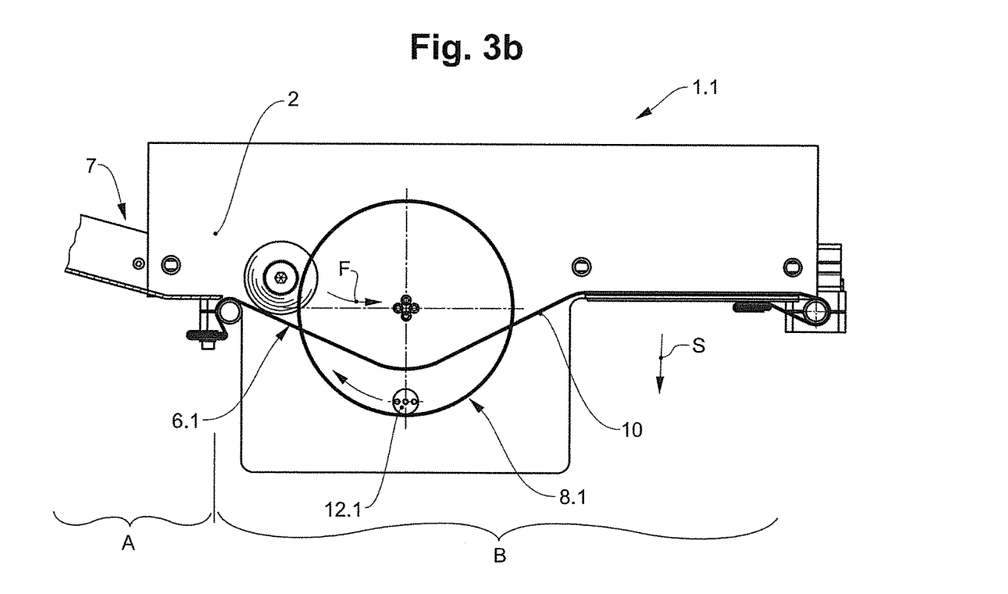
Figure 3C:
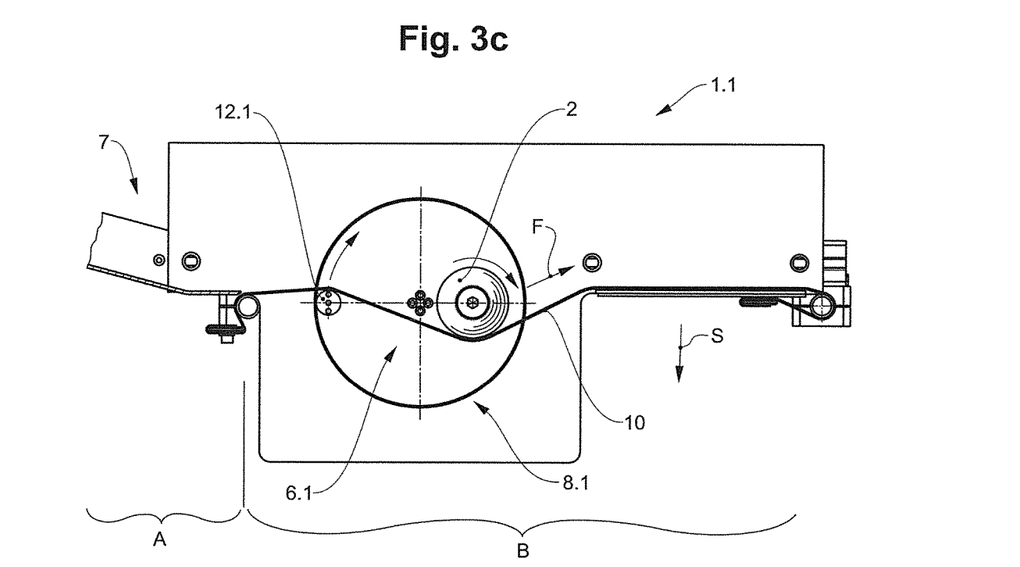
Figure 3D:
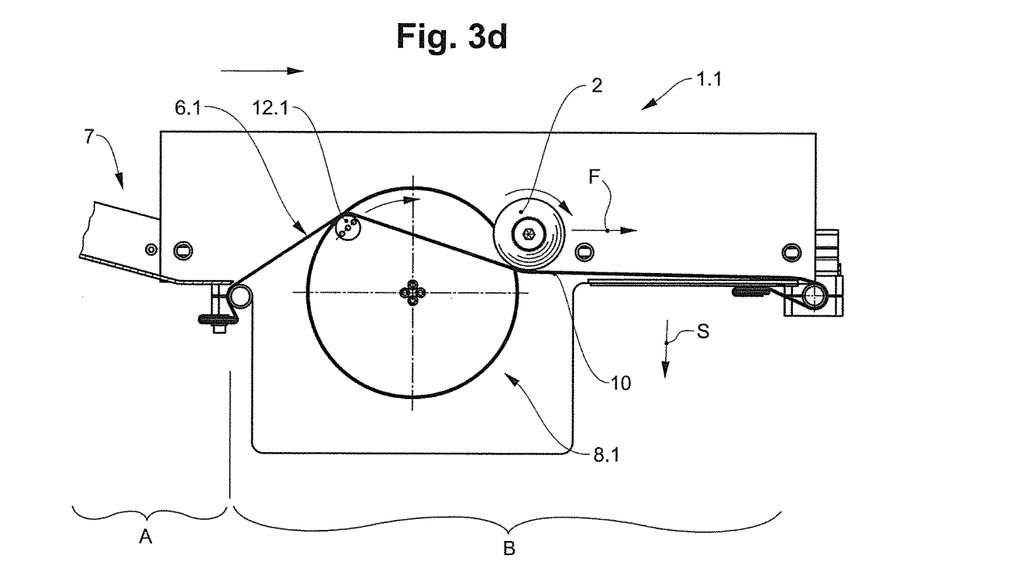

The discrete item 2 in the receiving trough 10 gets into an inclined trough section due to the lifting of the belt 6.1 and is brought into movement in the conveying direction F due to gravity on account of this (see FIG. 3d). Since the lifting procedure of the belt 6.1 propagates in the conveying direction F, the inclined trough section and, with this, the discrete item 2 also moves on in the conveying direction F.

The discrete item 2 is fed to the collecting region C of the collecting device 1.1 and transferred to this, in this manner (see FIG. 3d).

The crank or the arm 12.1 due to the rotation movement and in the course of its conveying-active movement reaches a highest point, at which the belt 6.1 is lifted to the maximum extent (see FIG. 3a).

The crank or the arm is moved down again in a subsequent movement section of the conveying-active movement. The next discrete item 2 can already be fed to the delay region B at this point in time.

The crank or the arm 12.1 after completion of the conveying-active movement is moved further downwards and with a continued rotation movement with a movement component counter to the conveying direction F is moved further into the initial position. The belt 6.1 after completion of the conveying-active movement again assumes its initial position amid a renewed formation of the receiving trough (see FIG. 3b).

According to the embodiment according to the second embodiment variant (FIGS. 4 and 5a-d), the discrete items support 6.2 is a support grating with a plurality of slot openings 11, which are arranged next to one another and spaced from one another.

The conveying mechanism 8.2 include several advance bodies 12.1 that are formed by a plurality of brush strips, which are arranged rotating about an axis. The brush strips include individual advance elements 13 in the form of bristles.

The brush strips 12.2 are brought into rotation about the axis for the purpose of conveying a discrete item 2 lying on the support grating 6.2, to the collecting region C. A brush strip 12.2 is thereby moved upwards through the slot openings 11 to above the support surface of the support grating 6.1, behind the discrete item 2 considered in the conveying direction F (see FIG. 5b).

Figure 5A:
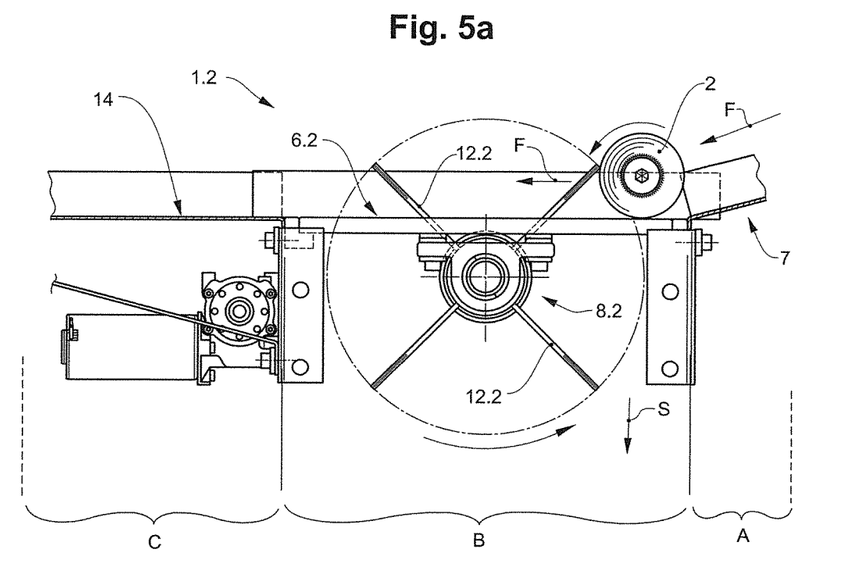
FIGS. 5a-5d are lateral views of the collecting device according to FIG. 4, with the conveying mechanism in different advance positions.
Figure 5B:
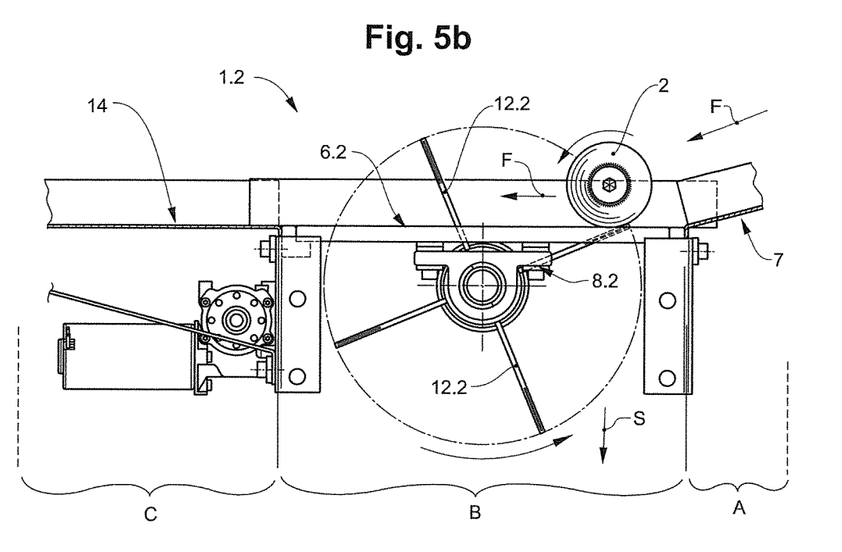
Figure 5C:
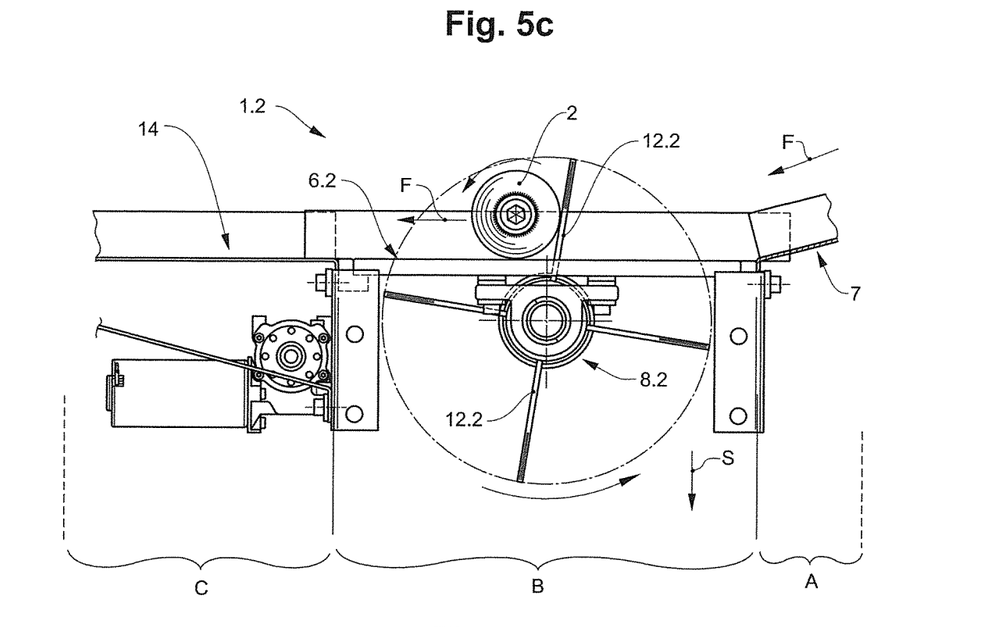

The brush strip 12.1 is simultaneously moved up to the discrete item 2 from the rear considered in the conveying direction F and assumes a conveying contact with this, due to the fact that the rotation movement of the brush strip 12.2 also includes a horizontal movement component in the conveying direction F (see FIG. 5c).

Figure 5D:
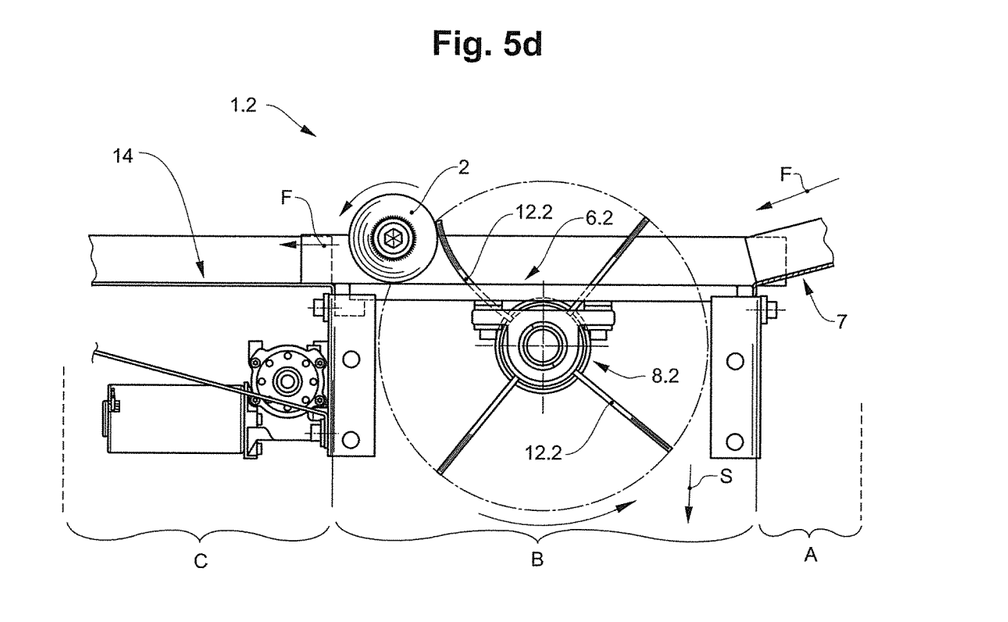

The brush strip 12.1 now pushes the discrete item 2 in the conveying direction F away from the support grating 6.2 towards the collecting region C, with a continuation of the rotation movement, which is to say conveying-active movement (see FIG. 5d).

The brush strip in the course of its conveying-active movement and on account of its rotation movement reaches a highest point, at which the brush strip 12.2 projects maximally above the support surface (see FIG. 5c).

In a subsequent movement section of the conveying-active movement, the brush strip 12.2 is again moved downwards, wherein this still continues to exert a conveying-active movement (see FIG. 5d) until reaching the level of the support surface.

The conveying-active movement is completed as soon as the brush strip 12.2 with the continued rotation movement is again arranged below the support surface.

The brush strip 12.2 with the continued rotation movement is now moved further with a horizontal movement component counter to the conveying direction F, into the initial position.

The invention claimed is:

1. A collecting device for a sorting facility, said collecting device collecting a discrete item that is delivered from a conveyor to a delivery location, wherein the collecting device forms the following regions:
   a collecting region in which a plurality of the discrete items are collected;
   a delay region with a flexible, extensive support body that forms a single receiving trough for the discrete item, such that the discrete item delivered from the conveyor is gently braked and held up in the single receiving trough, said delay region being prior to the collecting region, and
   a feed region with a feed device comprising a conveying chute, said feed region being prior to the delay region and via which the discrete item is fed from the delivery location to the delay region,
   wherein the single receiving trough in the delay region is formed between two fastening locations that are arranged successively and spaced from one another in the conveying direction and on which the flexible, extensive support body is supported, and wherein the delay region comprises a conveying mechanism, which is designed to lift the flexible, extensive support body in a region of the receiving trough, such that the held-up discrete item in the receiving trough that has been fed by the feed device is lifted out of the receiving trough and conveyed further in the conveying direction from the delay region into the collecting region.

2. The collecting device according to claim 1, wherein the conveying mechanism comprises at least one conveying-active advance body which, by way of a conveying-active movement, acts such that the held-up discrete item is conveyed further in the conveying direction.

3. The collecting device according to claim 2, wherein the at least one conveying-active advance body is designed for executing a cyclic movement.

4. The collecting device according to claim 1, wherein the conveying mechanism is designed to move the flexible, extensive support body in a wave-like manner.

5. A method for collecting discrete items that are delivered from a conveyor to a delivery location of a collecting device according to claim 1, comprising the steps of:
feeding a discrete item from the conveyor via the conveying chute in the feed region into the receiving trough of a delay region and thus gently braking and holding up of the discrete item in the delay region;
lifting the flexible, extensive support body in the region of the receiving trough by way of the conveying mechanism and thus lifting the discrete item out of the receiving trough and conveying said discrete item from the delay region to the collecting region in the conveying direction.

6. The method according to claim 5, wherein the conveying mechanism comprises at least one conveying-active advance body, and the at least one conveying-active advance body during a conveying-active movement and considered in the conveying direction is moved behind the discrete item held up in the receiving trough, towards the discrete item with a vertical movement component directed counter to the gravitational force and with a horizontal movement component directed in the conveying direction.

7. The method according to claim 6, wherein the at least one conveying-active advance body, during its conveying-active movement, is moved in a revolving device along a closed movement path.

8. The method according to claim 7, wherein the at least one conveying-active advance body, during its conveying-active movement, rotates about an axis.

9. The method according to claim 6, wherein the at least one conveying-active advance body acts via the flexible, extensive support body upon the discrete item.

10. The method according to claim 7, wherein the at least one conveying-active advance body acts via the flexible, extensive support body upon the discrete item.

11. The method according to claim 8, wherein the at least one conveying-active advance body acts via the flexible, extensive support body upon the discrete item.

12. A collecting device for a sorting facility for collecting discrete items that are delivered from a conveyor to a delivery location, wherein the collecting device forms the following regions:
a collecting region with a collecting device, in which collecting region the discrete items are collected;
a delay region with a discrete items support with at least one recess, said delay region being prior to the collecting region and in which a discrete item delivered from the conveyor is held up, and
a feed region with a feed device, said feed region being prior to the delay region and via which the discrete items are fed from the delivery location to the delay region,
wherein the delay region comprises a conveying mechanism with at least one conveying-active advance body that is capable of conveying a held-up discrete item from the delay region into the collecting region by way of a conveying-active movement, wherein the at least one conveying-active advance body is capable of acting through the at least one recess of the discrete items support upon the discrete item during the execution of a conveying-active movement.

13. The collecting device according to claim 12, wherein the at least one conveying-active advance body comprises a plurality of advance elements that are arranged distanced to one another transversely to the conveying direction and which, in each case, act through a recess in the discrete items support.

14. The collecting device according to claim 12, wherein the recesses are slot openings aligned parallel to the conveying direction.

15. A method for collecting discrete items that are delivered from a conveyor to a delivery location of a collecting device according to claim 12, comprising the steps of:
feeding a discrete item from the feed device of a feed region to the discrete items support of a delay region and holding up the discrete item in the delay region;
acting upon the discrete item by way of a conveying mechanism that executes a conveying-active movement in the delay region, by which means the discrete item is conveyed from the discrete items support in the delay region into a collecting region.

16. The method according to claim 15, wherein the conveying mechanism comprises at least one conveying-active advance body, and the at least one conveying-active advance body during its conveying-active movement and considered in the conveying direction is moved behind the discrete item held up on the discrete items support, towards the discrete item with a vertical movement component directed counter to the gravitational force and with a horizontal movement component directed in the conveying direction.

17. The method according to claim 15, wherein the conveying mechanism comprises at least one conveying-active advance body which, during its conveying-active movement, is moved in a revolving device along a closed movement path, in particular rotates about an axis.

18. The method according to claim 15, wherein the discrete items support is a flexible, extensive support body that forms a curvature with an ascending curvature section, and in particular a receiving trough for the discrete item, and the conveying mechanism lifts the flexible, extensive support body in the region of the curvature by way of the conveying-active movement, and thus conveys a discrete item, which is arranged in the region of the curvature, in particular in the receiving trough, in the conveying direction by way of the lifting of the support body.

19. The method according to claim 15, wherein the at least one conveying-active advance body acts directly or indirectly upon the discrete item.

* * * * *